United States Patent
Emmer et al.

(10) Patent No.: US 6,709,611 B1
(45) Date of Patent: Mar. 23, 2004

(54) METHOD FOR MAKING, BY BLOW MOULDING, PLASTIC HOLLOW BODIES, DEVICE AND INSTALLATION THEREFOR

(75) Inventors: Gerard Emmer, Le Havre Cedex (FR); Alain Evrard, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/744,588

(22) PCT Filed: Jul. 22, 1999

(86) PCT No.: PCT/FR99/01800

§ 371 (c)(1),
(2), (4) Date: Jan. 26, 2001

(87) PCT Pub. No.: WO00/06365

PCT Pub. Date: Feb. 10, 2000

(30) Foreign Application Priority Data

Jul. 29, 1998 (FR) ............................................. 98 09811

(51) Int. Cl.⁷ ......................... B29C 49/58; B29C 49/78
(52) U.S. Cl. .................. 264/37.16; 264/40.3; 264/523; 425/535; 425/538; 425/540; 425/145
(58) Field of Search ............................. 264/523, 37.16, 264/40.3; 425/535, 538, 540, 145

(56) References Cited

U.S. PATENT DOCUMENTS

| 4,488,863 | A |   | 12/1984 | Collette |          |
|-----------|---|---|---------|----------|----------|
| 5,015,166 | A | * | 5/1991  | Baxi     | 425/149  |
| 5,585,066 | A | * | 12/1996 | Weiss    | 264/526  |
| 5,648,026 | A | * | 7/1997  | Weiss    | 264/37.16|
| 5,817,348 | A | * | 10/1998 | Ikeda    | 425/529  |

FOREIGN PATENT DOCUMENTS

| EP | 0 655 313   | 5/1995 |
|----|-------------|--------|
| WO | WO 96 25285 | 8/1996 |

* cited by examiner

Primary Examiner—Suzanne E. McDowell
(74) Attorney, Agent, or Firm—Sughrue Mion, PLLC

(57) ABSTRACT

To blow plastic hollow bodies, each mold (7) has its respective compression chamber (21) connected to it, constituted by a cylinder (20)-piston (19) assembly; pressure is initialized in the chamber; the fluid is compressed in the chamber; the chamber is connected (22, 24, 25) with the blank (9) when the piston position attains a predetermined position and chamber volume continues to be reduced to complete the blowing. The invention can be applied in particular to the blowing of small-volume hollow bodies.

23 Claims, 3 Drawing Sheets

METHOD FOR MAKING, BY BLOW MOULDING, PLASTIC HOLLOW BODIES, DEVICE AND INSTALLATION THEREFOR

The object of the invention is improvements to methods for manufacturing hollow bodies, namely containers such as bottles, flasks, etc., obtained by blowing of plastic blanks in finishing molds; its object is also a device and an installation for implementing the method.

It can be applied in particular but not exclusively to the manufacture of small capacity hollow bodies, typically on the order of a half liter or less.

To manufacture a hollow body such as a container of a plastic such as polyethylene terephthalate (PET), polyethylene naphthalate (PEN) or polyvinyl chloride (PVC) in a single layer or multiple layers, it is known to produce a plastic blank, then to place this blank while it is at a softening temperature in a finishing mold, and to inject a blowing fluid (typically air) in the blank to transform it into a recipient.

Thus, so-called extrusion-blowing methods are known in which the blanks, referred to as parisons, are extruded tubes. To produce a container, a parison is closed in a mold and air is injected into the parison.

Injection-blow molding methods are also known in which the blanks are preforms obtained by injecting the plastic into the mold; then, after they are produced, the preforms are either transferred to the finishing mold and then immediately transformed into containers in the finishing mold (methods known as hot-cycle) or stored or transported before being softened by heating and transformed into containers in the mold (methods referred to as cold cycle).

A disadvantage of known machines for manufacturing hollow bodies lies in the generation and transfer of the blowing fluid to the blanks.

Indeed, blowing requires high pressure levels (typically ranging from 10 to 20 bars in the case of extrusion-blowing and in the 40-bar range in the case of injection-blow molding), thus causing considerable consumption of fluid. Blowing a one-liter hollow body produced by extrusion-blowing requires 10 to 20 liters of fluid; blowing a one-liter hollow body produced by injection-blow molding requires 40 liters of fluid.

To obtain sufficient pressure and flow levels with respect to production rates (1,200 containers per hour and per mold in the applicant's injection-blow molding machines), known machines are connected with at least one compressor that supplies the high pressure necessary for blowing.

The compressor operates continuously to be able to supply the quantity of air required for all the molds comprising the installation. As for the blowing, it takes place sequentially.

The primary disadvantages of such a structure are as follows:
first of all, due to the continuous operation of the compressor whereas blowing takes place sequentially, electrically or mechanically controlled valves must be provided to allow or prohibit the insertion of blowing fluid in the molds. These valves are continuously subjected upstream to the high pressure levels required for blowing. They therefore must be resistant and have a costly, complex design. Due to the operating speeds to which they are subjected, they deteriorate quickly. They thus constitute consumables that should be replaced relatively often:
the compressors used are accessory devices for the installations. Besides their cost and burdensomeness, it is necessary to provide fluid connections with the installations. These connections increase the risks of malfunction (leaks in the event of disconnection);
in addition, the same compressor is generally used to supply several installations. If this device fails, this may result in considerable production losses, since several installations may be dependent upon a single compressor;
with installations using a rotating carrousel technology in which the molds are carried by the carrousel, it is necessary to provide a rotating fluid connection to carry the high-pressure blowing fluid to the molds. In this case as well, it is a matter of a highly sensitive part with very restrictive manufacturing tolerances.

The objective of the invention is to remedy these disadvantages.

According to the invention, a method for manufacturing a hollow body by blowing a blank into a finishing mold with the help of a blowing fluid, is characterized in that it consists of connecting to each mold a separate compression chamber formed by a cylinder-piston assembly; establishing an initial fluid pressure in the chamber when it is at its maximum volume; reducing the chamber volume to compress the fluid while keeping the chamber and the inside of the blank isolated; connecting the chamber and the blank when the chamber volume reaches a defined value in order to initiate blowing of the blank by retention of the compressed fluid, and continuing to reduce chamber volume to a minimum while maintaining the connection with the blank and ending the blowing by compressing the fluid volume remaining in the chamber and transferring to the blank.

By connecting to each mold a compression chamber inside which the pressure ranges from a minimum (initial pressure) to the blowing pressure, there is no longer a device continuously undergoing the latter pressure.

In a form of construction, a controlled valve is arranged in the circuit between the chamber and the mold, but this valve undergoes pressure rise and drop cycles upstream. It is thus less restrictively subjected to stress.

The invention reduces the length of the fluid connections since the chamber can be placed as closely as possible to the corresponding mold.

An installation is no longer dependent upon a compressor. As a result, if a chamber is defective, it is possible to keep the rest of the installation running at least provisionally. In addition, two installations are not dependent on each other.

Lastly, high-pressure rotating fluid connections are no longer necessary even when the molds are carried by a carrousel, since each mold is connected with its respective chamber.

Another advantage of the invention is that compression of the air causes its temperature to rise, which considerably promotes blowing when the blank and thus the hollow body is of a thermoplastic matter. Indeed, if the air temperature exceeds the material's softening temperature, it prevents the material from solidifying during blowing.

The blowing temperature depends in large part on the initial pressure and, of course, on the compression ratio. It also depends on the predetermined piston position at which blowing is initiated.

This is why the initial pressure established in the compression chamber is preferably greater than the ambient pressure and, according to another characteristic, is established at least in part by an external low-pressure source.

Low-pressure source refers to an industrial source currently present in companies, ranging from 1 to 15 bars and typically 7 bars, for example.

Because it is low, there are no connection problems like those with a high-pressure source, as used to occur with installations of the prior art. Leakage risks are limited and the technology of fixed as well as rotating connections is perfectly mastered and much simpler.

Thus, for example, with a compression chamber with an initial volume of 1.5 liters, and initial pressure of 7 bars, an item of 300 cc is inflated at 35 bars (by initiating the connection between the chamber and the blank, thus the mold when the piston position is such that chamber volume reaches 300 cc).

With the same chamber, only 5 bars would be attained if the initial pressure were ambient pressure. To attain 35 bars, and blow a 300-cc article starting with ambient pressure, the chamber would have to have an initial volume of 7×1.5 liters, i.e., 10.5 liters.

The installation for implementation would become somewhat cumbersome.

According to another characteristic, initial pressure is obtained at least in part by returning the high-pressure fluid contained in the hollow body to the chamber when it is degassed.

According to another characteristic, the low-pressure circuit is connected so as to only supply fluid when the blowing cycle is established. It brings all of the fluid only when no hollow body has been blown, or when a blank has burst during blowing.

Indeed, after blowing, the total fluid circuit volume has increased by a level corresponding to the difference between the final volume of the hollow body and the initial volume of the blank. Not counting the initial volume of the blank and that of the connections between the chamber and the mold, and by taking the same parameters as previously, total fluid circuit volume would be 1,500 cc+300 cc after blowing, i.e., 1,800 cc filled with 10.5 liters of air, making it possible to obtain a 5.8-bar residual—thus initial—pressure for the subsequent blowing in the chamber.

Thus, the external source should only bring the supplement in order to obtain the 7 bars necessary in the case in question.

In this way, one achieves savings on the order of 80% in terms of external fluid brought in.

In this respect, the method is self-regulating: as indicated, if a blank accidentally bursts during blowing, the external supply will be total at the subsequent blowing.

According to another characteristic, a device for implementing the method comprises a compression chamber connected to a mold and consisting of a cylinder in which a piston is arranged; a fluid circuit connecting the compression chamber with means to establish an initial pressure in the compression chamber; means to connect the compression chamber and the inside of a blank placed in the mold when the piston position attains a predetermined position, and in that the length of the cylinder is such that after connecting, the piston's stroke continues to complete the blowing by transferring the fluid volume remaining in the chamber to the blank.

According to another characteristic, an installation comprising at least one device for blowing a hollow body also comprises: a chassis as well as a structure rotating around a pivot borne by the installation's chassis; at least one mold is attached to this rotating structure and is connected to its respective device; a first tip of each cylinder-piston assembly is connected to a respective first axle borne by the chassis, parallel to the pivot's axis and at a distance from it that defines the desired piston stroke; a second tip of each assembly is connected to a respective second axle borne by the rotating structure toward a peripheral zone thereof.

Thus, due to the eccentricity between the first axle and the pivot, an alternate movement of the piston is caused relative to the cylinder when the rotating structure rotates. In actual fact, the distance between the pivot and the first axle corresponds to half of the piston stroke.

In a preferred form of construction, the piston control stem is connected to the first axle, and the cylinder is connected to the second axle.

According to another characteristic, the installation comprises at least two molds and thus the same number of piston-cylinder assemblies; the first axle is shared by each of the assemblies and the second axles are arranged on the rotating structure at different positions equidistant from the pivot.

Each piston thus carries out the same movement as the other ones with a phase shift.

In these cases, the second axles are preferably spread angularly regularly on the rotating structure.

The cycle is thus regular.

Others characteristics and advantages of the invention will become clear when reading the description of the attached figures below, in which.

Figure 1A:
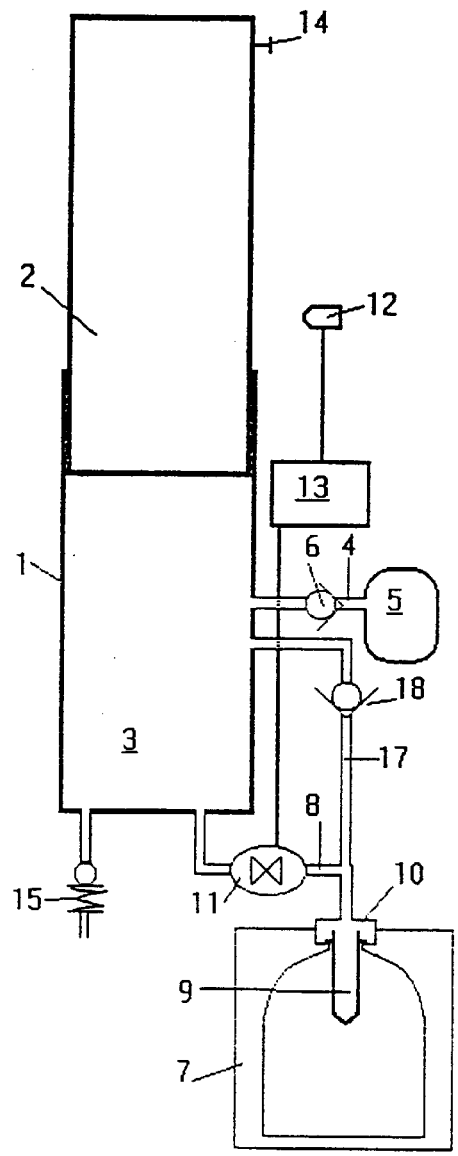
FIGS. 1a and 1b show in schematic form a compression chamber/mold assembly allowing implementation of the invention.
Figure 1B:
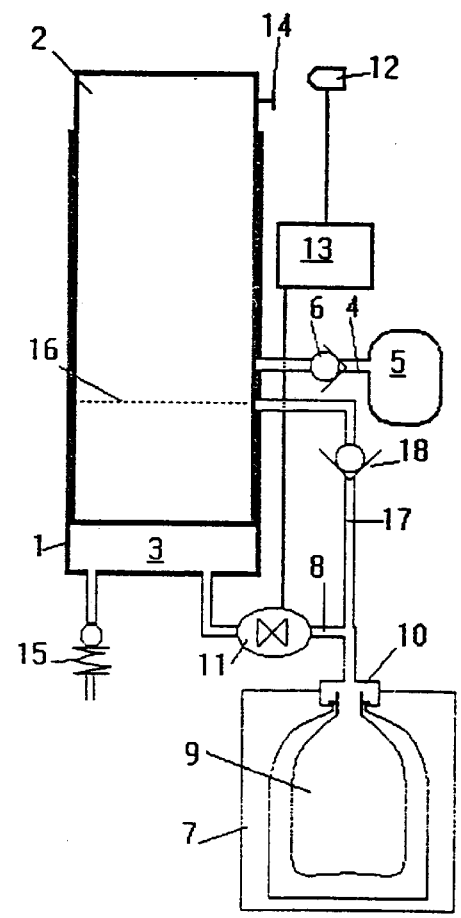
Figure 2A:
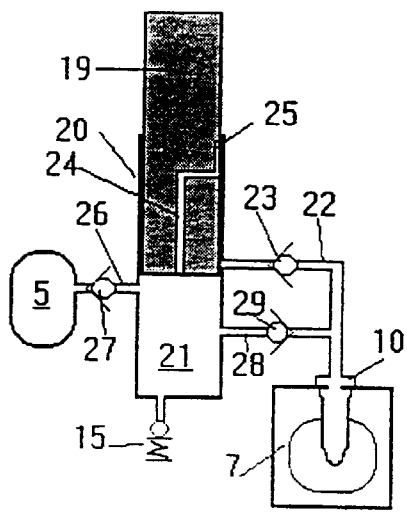
FIGS. 2a through 2d show an improved version of a compression chamber/mold assembly.
Figure 2B:
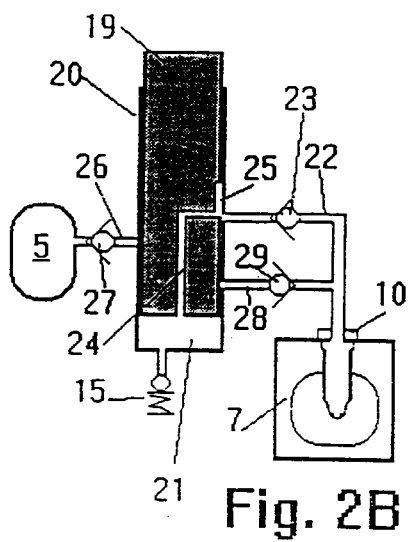
Figure 2C:
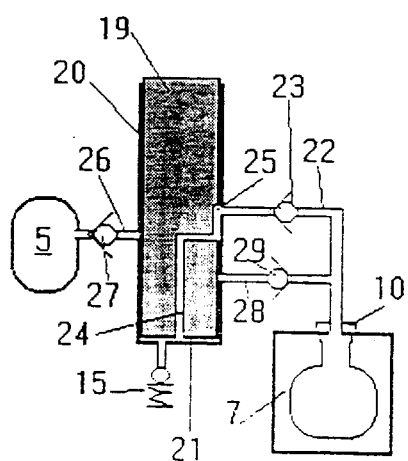
Figure 2D:
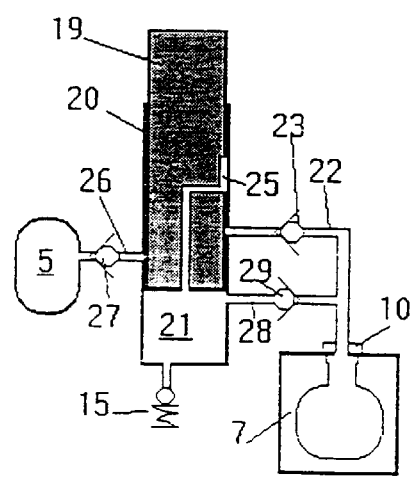
Figures 3A, 3B:
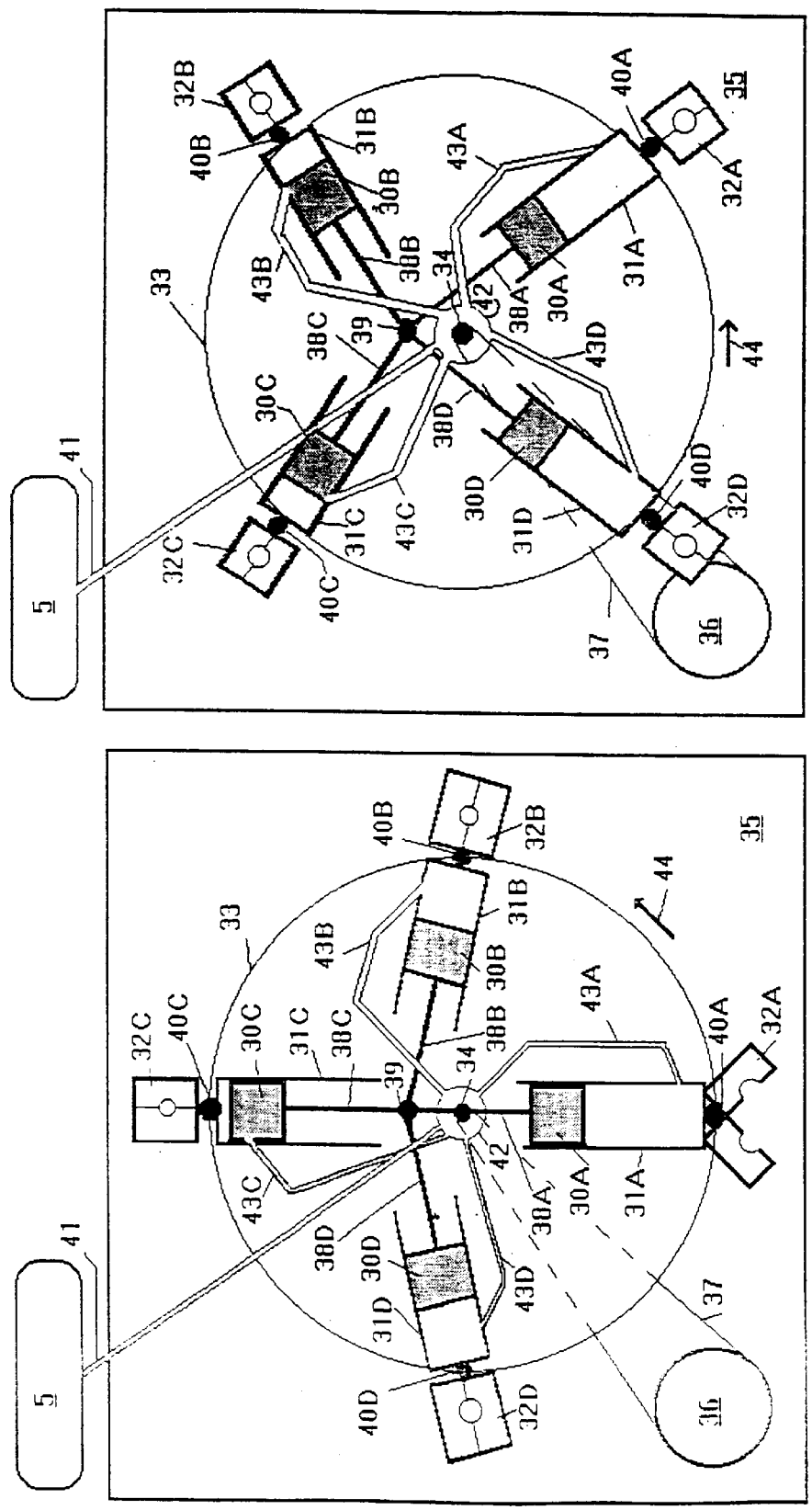

FIGS. 3a and 3b show in schematic form the principle of an installation comprising several assemblies corresponding either to that of FIGS. 1a through 1b or to that of FIGS. 2a through 2d.

FIG. 1a shows a first possible form of construction of a device for implementation of the invention when the chamber is at its maximum volume.

The device comprises a cylinder 1 and a piston 2 defining a compression chamber 3. The means of actuating the piston relative to the cylinder are not illustrated since this is a skeleton diagram.

The chamber 3 is connected by a fluid connection 4 to a low-pressure fluid source 5; in the example it is a source supplying industrial air at 7 bars.

A check valve 6 is interposed between the source 5 and the chamber 4. This valve makes it possible to bring the low-pressure into the chamber 3 only when the residual pressure is lower than that of the source 5 (7 bars in this instance). A valve is preferably as close to the chamber as possible to limit dead volumes.

The chamber is also connected to a blow mold 7 by a fluid connection 8.

In the example, a blank 9 is present in the mold. In this instance, the blank 9 is a preform previously obtained by injection, then brought to a blowing temperature before insertion into the mold 7. It could be a parison obtained by extrusion, however.

Basically familiar means 10 such as a nozzle in the case of a preform or a hollow needle in the case of a parison are provided to connect the fluid connection 8 and the inside of the blank 9. These means, available to the expert, as well as the means of positioning the blank in the mold, and the means of closing the mold will not be described in greater detail.

A valve 11 is placed in the fluid circuit 8 and makes it possible to connection the chamber 3 and the blank 9 when the piston position attains a predetermined position.

For this purpose, a detector 12 of the piston position is provided that is connected to an interface 13 controlling the valve 11 opening and closing.

The detector 12 may be of any appropriate kind (optic, mechanical, electronic). It may be connected directly to the piston/cylinder assembly in order to directly determine the piston's position relative to the cylinder; as an alternative, when this assembly is integrated into a machine with a cyclic operation, the detector may be arranged to determine at what stage of its cycle the machine is, so that the interface 13 can give opening or closing orders at the appropriate times.

One and the same detector can thus control several valves by way of an appropriate interface.

In the example, the detector 12 is of the optic type. It detects the passing of a mark 14 borne by the piston.

In addition, a safety valve 15 is preferably provided to avoid any deterioration of the device in the event of accidental overpressure. This valve is calibrated at a few bars above the desired blowing pressure. It may be calibrated at 40 bars, for example, for an intended blowing between 35 and 38 bars.

FIG. 1b illustrates the same device while the hollow body is in the process of being blown. The piston 2 is brought close to the end of the cylinder 1, and the valve 11 is opened. More specifically, the opening of the valve 11 occurred while the detector 12 had been activated by the mark's 14 passing; the piston was then in the position shown by the broken line 16.

Operation is as follows: when the piston is in the position of FIG. 1a, the initial pressure is established in the chamber (in this instance 7 bars and the parallel valve is closed); the piston 2 is moved relative to the cylinder 1 to reduce its volume, with the valve 11 always being closed: as a result, chamber pressure rises.

When the mark 14 passes in front of the detector 12 or, more generally speaking, when the interface 13 is activated, the valve 11 is opened: the hollow body starts its blowing. The piston then continues to move in order to reduce the volume, continuing the compression and thus the blowing of the hollow body.

However, the structure that has just been described requires at each blowing an initial pressurization of the chamber 3 by means of the low-pressure circuit.

Using the examples provided in the preamble, that would require 1.5 liters of air (or fluid) at 7 bars to blow a 300-cc container at 35 bars, i.e., 10.5 liters of air at ambient pressure for each container of this volume.

This is why, as illustrated in these FIGS. 1a and 1b, an additional fluid connection 17 is preferably provided in order to return the high-pressure fluid contained in the hollow body to the chamber 3 after blowing and at the time of degassing.

This connection joins the chamber 3 with the section of the connection 8 between the valve 11 and the mold 7. A check valve 18 is arranged in this connection to prevent the fluid contained in the chamber 3 from directly entering the mold 7 at the time of compression or blowing.

As illustrated in these figures, the connection 17 preferably does not end at the bottom of the cylinder but on the cylinder wall in an area between the two end positions of the piston. Thus, after blowing, when the piston 2 is moved so as to increase the chamber volume and then return to the initial position, the high-pressure air contained in the hollow body is not immediately reintroduced into the chamber. This makes it possible to keep the hollow body pressurized in the mold for a period of time, for example to promote its definitive forming.

Then, when the piston 2 is moved so as to increase chamber volume, the pressurized fluid contained in the hollow body returns to the chamber when the connection 17 is no longer blocked by the piston.

However, since the device's total volume has increased during blowing, a simple return of the fluid is not sufficient to obtain the desired initial pressure: fluid is thus supplied automatically from the source 5.

In addition, to promote the sending of the fluid from the hollow body to the chamber and reduce the supply of low-pressure fluid as much as possible, the connection 4 ends in the cylinder wall between the outlet of the connection 17 and the piston's 2 distal position relative to the cylinder bottom, that is, the position in which the chamber volume is at its maximum.

Thus, after blowing and when the chamber volume increases, the air contained in the hollow body is inserted into the chamber before that of the low-pressure source 5 that only provides the necessary supply.

The device of FIGS. 1a and 1b thus makes it possible to blow hollow bodies practically automatically. However, it requires the use of a valve which, without being stressed in the same way as with the devices of the prior art since it undergoes cyclic pressure changes, is still not continuously subjected to high pressure.

However, the device illustrated in FIGS. 2a through 2d which no longer requires a valve nor a detector and allows automatic blowing is preferred to the preceding one.

The device comprises a piston 19 sliding in a cylinder 20 to define a compression chamber 21. A safety valve 15 is provided as in the cases of FIGS. 1a and 1b.

The piston cannot move between a position where chamber volume is at its maximum (FIG. 2a) and a position in which this volume is at a minimum (FIG. 2c). A fluid pipe or connection 22 ends with a first tip in the cylinder 20, through its wall, in an area opposite the piston 19 at any time during its stroke. This pipe 22 is connected by its second tip with the basically known blowing means 10 connected to the mold 7.

A check valve 23 is arranged on the pipe 22 to prevent fluid (air) from returning to the cylinder, as will be explained later.

An opening 24 is arranged in the mass of the piston. It ends on the one hand in the compression chamber 21 and on the other hand in a countersinking 25 arranged at the periphery of the piston.

The position of the countersinking is such that when the piston arrives in the defined position to initiate blowing, the countersinking arrives opposite the pipe 22 in such a way that the pipe is no longer blocked and a connection is then ensured between the chamber 21 and the pipe 22 through the opening 24 and the countersinking 25 arranged in the piston.

In addition, the dimensions of the countersinking are such that while the piston continues its stroke to reduce chamber volume, the compressed fluid continues to make its way toward the mold 7 through the opening 24, the countersinking 25 and the pipe 22.

Thus, FIG. 2b illustrates the moment when the piston 19 in the process of compression has just gone beyond the position to initiate blowing: fluid circulation may set in between the chamber 21 and the mold 7, and more specifically between the chamber and the blank 9 arranged in the mold.

FIG. 2c thus illustrates the piston position at the end of blowing: chamber 21 volume is at a minimum but the mold 7 is always connected with the chamber by way of the opening 24, the countersinking 25 and the pipe 22.

The function of the check valve 23 located on the pipe 22 is to prevent the pressurized fluid contained in the hollow body when blowing is finished from returning to the chamber 21 when the piston initiates its return movement to its initial position, while the countersinking 25 is still opposite the opening 22. The high pressure is thus maintained at the end of blowing in the hollow body, allowing it to stabilize.

Another pipe 26 connects the chamber 21 and a low-pressure fluid source 5 in order to initialize pressure in the chamber when the piston position is such that chamber volume is at a maximum (or near its maximum).

A check valve 27 is provided in the pipe 26 to prevent fluid from escaping toward the source 5 when the piston 19 compresses the fluid in the chamber.

The structure that has just been described makes it possible to achieve automatic blowing of the hollow body. However, it requires pressure initialization to be completely carried out with the external source 5.

For this reason, to avoid excessive consumption on the external source 5, in a preferred form of construction at least part of the pressurized fluid contained in the hollow body at the end of blowing is evacuated to the chamber.

For this purpose, a pipe 28 is provided between the chamber and the mold. A check valve 29 is arranged on this pipe in such a way that it blocks any transfer of fluid from the chamber 21 to the mold 7 through the pipe 28. This valve allows only a transfer from the hollow body to the chamber when residual pressure in the hollow body is greater than that of the chamber.

To make it possible to maintain pressure in the hollow body at the end of blowing, for example to help stabilize it, the pipe 28 does not end in the cylinder bottom but through its wall, in a position that is blocked by the piston during part of its return movement to maximum volume. The pipe 28 thus only allows the transfer of fluid from the hollow body to the chamber when the piston starts releasing the pp. Thus, in FIG. 2d the pipe 28 is completely released by the piston in motion in order to increase chamber volume: the fluid in the hollow body can make its way toward the chamber (as long as pressure in the hollow body is greater than that of the chamber).

As in the cases of FIGS. 1a and 1b, the device does not allow a complete initialization of the chamber after blowing of a hollow body from the pressure contained in this hollow body, particularly because of the volume change due to the blowing.

However, as in the preceding case and preferably in order to promote reuse of the fluid contained in the hollow body, the pipe 26 connected to the low-pressure source 5 is arranged in such a way that the maximum fluid contained in the hollow body is transferred to the chamber before the low-pressure fluid is sent to the chamber.

To do this, for example, as illustrated by FIGS. 2a through 2d, this pipe 26 ends in an area of the cylinder wall farther from the cylinder bottom than the pipe 28 for transferring the fluid from the hollow body to the chamber. Thus, the low-pressure fluid can only be transferred from the source 5 to the chamber 21 when the piston is not opposite the pipe 26 and when pressure in the chamber is lower than that of the source.

In FIG. 2a, the piston is in maximum volume position; the pipe 26 is unblocked: initialization can take place. It should be noted that if a hollow body was blown beforehand, part of the fluid it contained has been reinserted into the chamber 21 since the pipe 28 is open in the chamber.

In FIG. 2b, the piston 19 has compressed the fluid in the chamber 21 and the pipe 22 arrives opposite the counter-sinking: blowing begins.

In FIG. 2c, the piston is at the end of its stroke (minimum volume); compression is completed but the fluid contained in the hollow body cannot return to the chamber due to the action of the check valve 23 and the blocking of the pipe 28 by the piston.

In FIG. 2d, the pipe 28 is released following the piston's 19 movement to the maximum volume position: a transfer can take place from the hollow body to the chamber 21.

FIGS. 3a and 3b illustrate the skeleton diagram of an installation implementing the invention in very advantageous manner.

In the example, the installation comprises four piston 30a, 30b, 30c, 30d—cylinder 31a, 31b, 31c, 31d assemblies each connected to its respective mold 32a, 32b, 32c, 32d.

A rotating structure 33 such as a carrousel is caused to turn around a pivot 31 borne by the installation's chassis 35.

A motor 36, preferably electric, draws the carrousel by a belt 37.

In the preferred form of construction illustrated by these figures, each piston is attached to the first end of a respective stem 38a, 38b, 38c, 38d, the other end of which is connected to a shared axle 39 borne by the chassis 35, parallel to the pivot's axis and at a distance from it corresponding to half of the piston's stroke.

As for the cylinders, they are hinged on a respective axle 40a, 40b, 40c, 40d borne by the rotating structure 33 toward the periphery of the structure. Each of the axles is equidistant from the pivot 34.

Alternately, it is conceivable to hinge the cylinders on the shared axle 39, and the pistons by their stems on the respective axles 40a, 40b, 40c, 40d. The encumbrance would be difficult to control, however.

As illustrated by these FIGS. 3a and 3b, the axles 40a, 40b, 40c and 40d are preferably angularly spread in regular manner over the rotating structure.

Due to the eccentricity between the pivot 34 and the shared axle 39, a rotation of the structure causes each piston to move in its respective cylinder. In addition, due to this eccentricity, the stems 38a, 38b, 38c and 38d as well as the cylinders oscillate in the horizontal plane relative to the shared axle 39 and the respective axles 40a, 40b, 40c and 40d, respectively.

A low-pressure source 5 to initialize pressure in the cylinders is arranged outside the rotating structure and is connected to it by a pipe 41 ending on a rotating, low-pressure attachment 42, preferably aligned along the pivot's 34 axis.

Pipes 43a, 43b, 43c, 43d start from the rotating attachment toward the cylinders.

In order not to overload these FIGS. 3a and 3b, details of the connections between each mold and the related cylinder-piston assembly were not illustrated, all the more since the skeleton diagram illustrated by FIGS. 3a and 3b applies indifferently to the first variant (FIGS. 1a and 1b) and to the second one (FIGS. 2a through 2d).

In the same way, details of the devices for opening/closing the molds, inserting the blanks and removal of the hollow bodies were not shown.

Assuming the structure is rotating in the direction of the arrow 44, operation is established as follows.

The chamber defined by the piston 30a and the cylinder 31a is at its maximum volume. This corresponds to the position of the FIG. 2a.

The corresponding mold 32a is shown open because when a piston is in this position, it is possible to unload a completed hollow body and load a blank.

In fact, unloading may start slightly before the piston has attained this position, i.e., more specifically when the hollow body is degassed.

As for the closing of the mold after a blank is loaded, this must be effective before the piston has attained the defined position as of which blowing can begin.

The piston 30b is in the process of compressing the corresponding chamber, without having attained the blowing position.

The piston 30c is in its end position. Blowing is completed in this assembly. For the reader's information, this corresponds to the position of the FIG. 2c.

The piston 30d is in motion, increasing the corresponding chamber's volume. This corresponds approximately to the position of the FIG. 2d (transfer of the fluid from the hollow body to the chamber).

In FIG. 3b the piston 30a has begun its compression stroke; the piston 30b has attained the position where blowing can begin; the piston 30c is an intermediate position between the position of FIGS. 2c and 2d (hollow body stabilization); the piston 30d is in a position where pressures are balanced between the chamber and the hollow body. The mold can thus be opened to remove the hollow body; at the same time, fluid may be supplied from low-pressure fluid source 5.

As the preceding shows, the invention is applicable to injection-blow molding or extrusion-blowing installations. It offers a fundamental advantage in the case of injection-blow molding installations since it makes it possible to dispense with the high-pressure rotating attachments and the problems inherent in compressors.

It has a particular advantage for blowing small items, that is, for volumes on the order of one liter or less: beyond that, if one wants to remain dependent on industrially available low pressures, the compression chamber volumes must be increased in particular and this quickly leads to an unrealistic encumbrance.

Of course, the invention is not limited to the forms of construction described and specifically claimed; it covers all equivalents thereof within the expert's reach.

What is claimed is:

1. Method for manufacturing a hollow body by blowing a blank into a finishing mold with the help of a blowing fluid, comprising connecting to each mold a separate compression chamber formed by a cylinder-piston assembly; establishing an initial fluid pressure in the chamber when it is at its maximum volume; reducing the chamber volume to compress the fluid while keeping the chamber and the inside of the blank isolated; connecting the chamber and the blank when the piston reaches a predetermined position in order to initiate blowing of the blank by retention of the compressed fluid, and continuing to reduce chamber volume to a minimum while maintaining the connection with the blank and ending the blowing by compressing the fluid volume remaining in the chamber and transferring to the blank.

2. Method according to claim 1, characterized in that the initial pressure is established in the chamber at least in part with the help of an external source of low-pressure fluid connected to the chamber by a low-pressure circuit.

3. Method according to claim 2, characterized in that the low-pressure source provides a pressure ranging from 1 to 15 bars.

4. Method according to claim 3, characterized in that the low-pressure source provides a pressure of 7 bars.

5. Method according to claim 2, further providing isolating means between the chamber and the low-pressure fluid circuit in order to prevent the fluid contained in the chamber from being reinjected into the low-pressure circuit.

6. Method according to claim 1, characterized in that the initial pressure is established in the chamber at least in part by returning the high-pressure fluid contained in the body to the chamber when it is degassed.

7. Method according to claim 1, characterized in that the low-pressure source brings fluid in addition to the degassing in order to obtain the initial pressure when a hollow body was blown in the mold during the preceding cycle.

8. Method according to claim 1, characterized in that it consists of keeping the pressurized fluid contained in the hollow body for a defined period after it has been blown.

9. Device for implementing the method according to claim 1, characterized in that it comprises, connected to a mold, a compression chamber constituted by a cylinder in which are arranged a piston; a fluid circuit connecting the chamber with means to establish an initial pressure in the chamber when it is at its maximum volume while being isolated from the inside of the blank; means to connect the compression chamber with the inside of a blank placed in the mold, when the piston position attains a predetermined position, and in that the length of the cylinder is such that after connecting the chamber with the blank, the stroke of the piston can continue and complete the blowing by transferring the fluid volume remaining in the chamber to the blank.

10. Device according to claim 9, characterized in that the means to connect the compression chamber with the blank are constituted by a fluid connection ending on the one hand at the bottom of the chamber and on the other hand in the blank, and in that a valve, the opening and closing of which are controlled by piston position detection means connected to a control interface, is arranged in this connection.

11. Device according to claim 9, characterized in that the means for connecting the compression chamber and the blank comprise: on the one hand, a pipe with a first tip that ends in the cylinder through its wall, in an area opposite the piston at any time during its stroke, and with a second tip connecting the blowing means connected to the mold; on the other hand, an opening arranged in the piston, with one end ending in the compression chamber and a second end ending in a countersinking arranged at the periphery of the piston, and in that the position of the countersinking is such that when the piston arrives in the predetermined position to initiate blowing, the countersinking arrives opposite the first end of the pipe, and in that the dimensions of the countersinking are such that when the piston continues its stroke to complete the blowing, the countersinking is still opposite the pipe.

12. Device according to claim 11, characterized in that a check valve is arranged on the pipe to prevent fluid from returning from the hollow body to the chamber when the piston has completed its stroke and initiates its return movement to its initial position, whereas the countersinking is always opposite the opening.

13. Device according to claim 9, characterized in that the chamber is connected to a source of low-pressure fluid by a connection in which check means are provided to prevent fluid from being returned to the source after compression begins.

14. Device according to claim 13, characterized in that the connection ends in the chamber opposite the wall of the cylinder in a zone comprised between the two end positions of the piston in such a way that this connection is closed by the piston during part of its stroke.

15. Device according to claim 9, characterized in that the chamber is connected with the mold by a connection provided with check means in order, during compression, to prevent the fluid from being transferred directly to the mold while sufficient pressure has not been attained, and to allow the pressurized fluid contained in the hollow body to return to the chamber after blowing.

16. Device according to claim 15, characterized in that the connection ends in the chamber opposite the wall of the cylinder, in a zone comprised between the two end positions of the piston in such a way that this connection is closed by the piston during part of its stroke.

17. Device according to claim 14, characterized in that the connection between the chamber and the low-pressure source ends in a zone of the cylinder wall farther from the cylinder than the connection between the chamber and the mold.

18. Device according to claim 9, characterized in that it comprises a safety valve arranged at the bottom of the chamber to prevent overpressure.

19. Installation comprising at least one device according to claim 9, characterized in that it additionally comprises a chassis, a structure rotating around a pivot borne by the chassis and at least one mold attached to this structure and connected to its respective device; and also in that a first end of each cylinder-piston assembly is connected to a first respective axle borne by the chassis parallel to the pivot's axis and at a distance from it that defines the desired piston stroke; and in that a second end of each cylinder-piston assembly is connected to a respective second axle parallel to the first and borne by the rotating structure toward a peripheral zone thereof.

20. Installation according to claim 19, characterized by a piston comprising a control stem which is connected to the first axle and the cylinder is connected to the second axle.

21. Installation according to claim 19, characterized in that it comprises at least two devices, and in that the first axle is shared by each of the devices and the second axles are arranged on the rotating structure at equal distance from the pivot.

22. Installation according to claim 21, characterized in that these second axles are angularly spread regularly on the rotating structure.

23. Installation according to claim 19, characterized in that it is connected to an external low-pressure source and a low-pressure rotating connection is arranged in the axis of the piston.

* * * * *